United States Patent Office 3,156,608
Patented Nov. 10, 1964

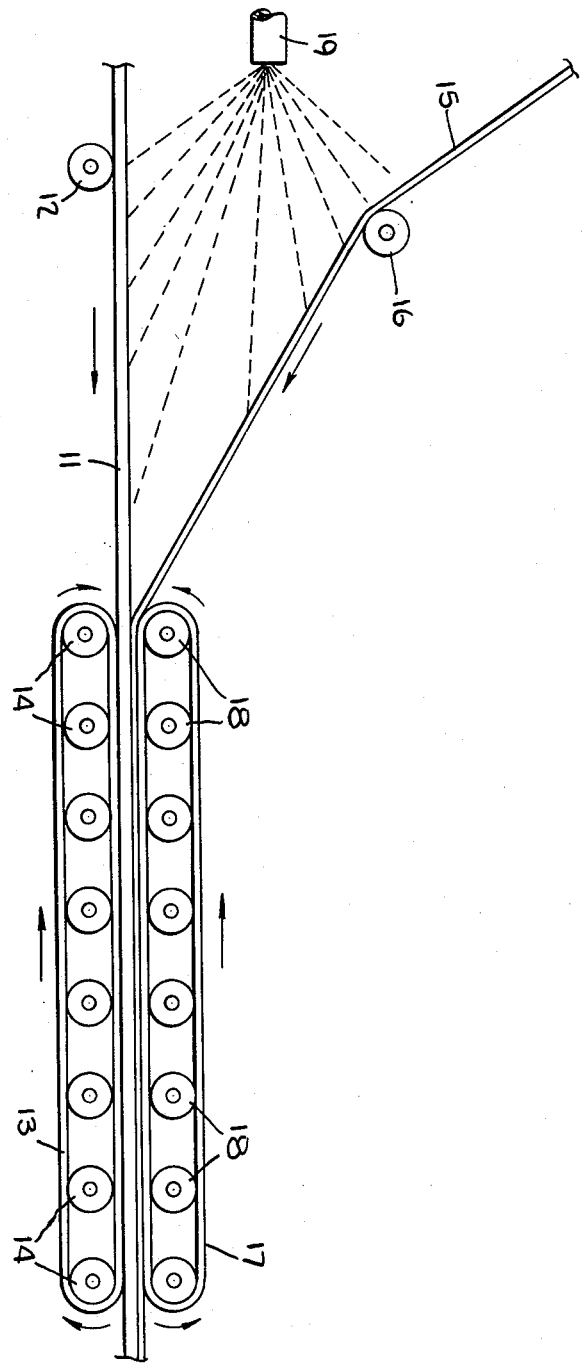

3,156,608
BONDING OF THERMOPLASTIC MATERIALS
Jack M. Kamins, New York, N.Y., and Seymour R. Russell, Metuchen, N.J., assignors to Celanese Corporation of America, New York, N.Y., a corporation of Delaware
Filed July 28, 1960, Ser. No. 45,933
3 Claims. (Cl. 161—269)

This invention relates to the bonding of thermoplastic articles and particularly to the bonding of thermoplastic sheets to each other at moderate temperatures and pressures.

In the formation of useful articles from sheets of cellulose acetate, for example, it is often desirable to bond such sheets to each other for structural or decorative purposes. The bonding is usually accomplished by the application of an adhesive material to the surfaces of the sheets to be bonded, the positioning of the sheets in the position desired and the application of elevated temperatures and pressures to the positioned sheets to achieve a bond.

The satisfactory bonding of cellulose acetate sheets to each other is difficult since satisfactory bonds must be free of cracks, warpage and bubbles and resistant to peeling. Many bonding processes produce bonds which are satisfactory in some respects but not in others. For example, high temperature bonding of cellulose acetate sheets often produces warping at the bonded surfaces while low temperature bonding is often subject to easy peeling. The satisfactory bonding of an embossed cellulose acetate sheet to another cellulose acetate sheet is particularly difficult since many adhesive materials, under bonding conditions, tend to swell and distort an embossed pattern on the surface of a cellulose acetate sheet.

For production purposes, a bonding method must not only be capable of producing a satisfactory bond but must also produce such a bond within a short period and be adaptable to continuous operation. Thus, a bonding method which involves the application of a liquid material to the surface to be bonded should utilize a liquid material which is capable of application by spraying and which is capable of penetrating the surface to be bonded within a short period so that a satisfactory bond may be achieved rapidly.

It is an object of this invention to provide a method for the bonding of cellulose acetate wherein bonds free of the foregoing defects are produced at a rate suitable for commercial production. Further objects will appear from the following description.

The objects of this invention are achieved by a method of bonding articles and particularly sheets of a thermoplastic material to each other which comprises applying to the surfaces to be bonded a dispersion of particles of said thermoplastic material in a dispersion medium comprising a non-volatile plasticizer for said thermoplastic material, a volatile non-solvent for said thermoplastic material and a volatile solvent for said thermoplastic material and pressing said surfaces together. For convenience the invention is described below with reference to its application to cellulose acetate although it is applicable to other resinous thermoplastic materials.

The preferred plasticizers are normally liquid materials having boiling points in excess of about 200° C. and capable of entering into a single phase solid admixture with cellulose acetate to the extent of at least 10 percent by weight of plasticizer based on the combined weight of resin and plasticizer. The preferred plasticizers do not change chemically during the bonding operation.

The preferred non-solvents are normally liquid materials having boiling points below about 150° C. and incapable of dissolving 1% of their weight of cellulose acetate at room temperature.

The preferred solvents are normally liquid materials having boiling points below about 160° C. and capable of forming a clear solution containing 10% of their weight of cellulose acetate (as particles of 40 mesh in an agitated system) at room temperature in less than about one hour. The especially preferred solvents have boiling points below about 80° C.

In the preparation of dispersions of cellulose acetate particles in accordance with this invention, the cellulose acetate must be reduced to relatively small particle size. The average particle size may vary from about 0.1 to about 50 microns, but preferably the average particles should be no larger than about 15 microns in diameter.

The weight ratio of cellulose acetate particles to dispersion medium will depend upon the nature and proportions of the constituents in the dispersion medium and upon the desired properties, and principally desired viscosity of the dispersion. Between about 7 and about 24 parts by weight of dispersion medium per part of cellulose acetate has been found to be suitable. The viscosity of such dispersion (measured at room temperature) is generally between about 40 and about 9000 centipoises.

In the dispersion medium the plasticizer preferably constitutes between about 2 and 12 parts by weight, the non-solvent preferably constitutes between about 2 and 18 parts by weight and the solvent between about 1 and 12 parts by weight.

Among the suitable plasticizers which may be used are dimethyl phthalate, triethyl citrate, dimethoxyethyl phthalate, dibutyl phthalate, diethyl phthalate, triphenyl phosphate, diacetin and triacetin. Among the suitable non-solvents which may be used are methanol, ethanol, 1-propanol, 2-propanol, denatured ethanol, 1-butanol, benzene, toluene and carbon tetrachloride. Among the suitable solvents which may be used are ethoxyethyl acetate, methoxyethyl acetate, acetone, methyl ethyl ketone, methyl isobutyl ketone, ethyl acetate.

In preparing sprays from the above-described dispersions, conventional spray nozzles and conventional spray techniques may be used. A suitable spray may be obtained from a dispersion of about 200 centipoises by passage through an orifice of 0.0425" diameter under a pressure of 80 p.s.i.g.

It may be desirable to heat the dispersion at or before the spray nozzle to reduce its viscosity and permit spray formation at lower pressures. Upon heating, the cellulose acetate may be dissolved so that a solution is formed. However, the relative volatilities of the liquid components of this solution are such that a dispersion will be formed from such a solution by reprecipitation of the cellulose acetate as a portion of the volatile solvent is flashed off during the spraying operation.

The dispersion is conveniently applied to the surface of the sheet in amounts between about 0.01 and about 0.03 pound of dispersion per square foot of surface, and preferably in amounts between about 0.015 and about 0.025 pound per square foot.

The cellulose acetate sheets to be bonded may be of any suitable thickness as for example from as little as 0.005" to as much as 0.250", or more. The bonding of a large number of sheets into a single laminate structure may be achieved by successive or simultaneous bonding. The latter is preferred since it minimizes the opportunity for distortion.

In a preferred embodiment of this invention, one of the sheets has a printed or embossed pattern or design on its surface and the other is a clear transparent sheet. The cellulose acetate may conveniently be composed of cellulose acetate having an acetyl content from about 50% to about 62.5%, calculated as acetic acid. Plasticizers, such as triphenyl phosphate, dimethoxyethyl phthalate, diethyl phthalate and triethyl phosphate may be in the cellulose acetate sheets in amounts between about 10 and 35 weight percent, based on the total weight of the sheet.

Upon contact of the dispersion spray with the cellulose acetate surface, a portion of the solvent penetrates the surface while another portion of the solvent continues to be evaporated. A portion of the non-solvent is also evaporated. Surprisingly, the distortion at the surface of the bonded sheet which might be expected to result from the presence of the solvent in the system does not take place.

The temperature of the spray zone may vary considerably but should be high enough to permit a substantial amount of solvent to evaporate. Temperatures between about room temperature and about 40° C. are suitable. The drying period between the application of the spray and the assembly of the surfaces to be bonded is suitably between about 0.5 and about 90 minutes.

The sheets to be bonded are preferably pressed together at a temperature between about 50°C. and about 150°C. and at a pressure between about 50 and about 600 p.s.i.

In one specific embodiment, described with reference to the figure, a sheet of cellulose acetate 11, 0.10 inch thick and 22 inches wide, moves continuously toward the right (as shown in the figure) from an extruder (not shown) over roller 12 and belt 13. Belt 13 moves clockwise over a series of heated rollers 14. Another sheet of cellulose acetate sheet 15, 0.015" inch thick and of the same width as sheet 11, also moves toward the right. Sheet 15 is embossed on its underside in a desired pattern. Sheet 15 passes under roller 16 and then under belt 17 which is close to and opposite belt 13. Belt 17 moves counter clockwise over heated rollers 18 at the same linear rate as belt 13. Nozzle 19, in the vicinity of rollers 12 and 16 sprays a divergent atomized stream of dispersion which covers both sheets 11 and 15 as they pass. The dispersion is a dispersion of one part by weight of cellulose acetate particles of 15 micron average diameter in a dispersion medium comprising about four parts by weight of dimethyl phthalate, about six parts by weight of ethanol and about two parts by weight of methoxyethyl acetate. The sheets 11 and 15 move at about five feet per minute and the time elapsed between first contact with the spray and arriving at the belts pair 13 and 17 is about one minute. Sheets 11 and 15 come into contact with each other between belts 13 and 17 which exert a pressure of about 50 pounds per square inch on the sheets and cause them to adhere. The temperature between the belts is maintained at about 250° F. and the sheets take about five minutes to traverse the length of the belts. The bonded sheets then pass to a cutter (not shown) which cuts the laminate into desired lengths.

*Example I*

One part by weight of cellulose acetate (acetyl value 54.7%) particles of 15 micron average diameter was blended with a dispersion medium containing 6 parts of dimethyl phthalate, 10 parts of ethanol and 6 parts of methoxyethyl acetate. The dispersion produced had a viscosity of 180 centipoises.

Two pairs of half sheets (22" x 26" area) of cellulose acetate were prepared. In one pair, both half sheets were clear and 0.065" thick and contained 18.5% diethyl phthalate and 7.5% triphenyl phosphate. In the other pair, one half sheet was similar to sheets described above except that it was 0.160" thick. The other half sheet was opaque (pearlized), was 0.020" thick and contained 15.4% diethyl phthalate, 7.7% triphenyl phosphate, and 2.8% of synthetic pearl essence. The acetyl value of the cellulose acetate in all of the half sheets was 54.7% (calculated as acetic acid.)

The above described dispersion (a turbid liquid) was applied by spray to one surface of each of the half sheets at room temperature. The spray gun was about 6 to 8 inches from the surfaces. The sheet surfaces were dried for 45 minutes at room temperature and assumed the matte appearance of fine sandpaper. They were then compressed together and cured at a pressure of 400 p.s.i.g. and a temperature of 205° F. over a period of 30 minutes. Laminates of excellent appearance and bond strength were produced.

*Example II*

Example I was repeated except that the dispersion medium contained 8 parts by weight of dimethyl phthalate, 14 parts by weight of ethanol and 2 parts by weight of acetone. The dispersion had a viscosity of 80 centipoises and the curing temperature was 220° F.

*Example III*

Example I was repeated except that the dispersion medium contained 4 parts by weight of dimethyl phthalate, 6 parts by weight of denatured ethanol and 2 parts by weight of methoxyethyl acetate. The cellulose acetate in this case was flake ground to pass through a 40 mesh screen but the mixture was heated to 150°–160° F. before passing through the spray gun. The mixture was a clear solution (viscosity—150 centipoises) when sprayed but was turbid and grainy on the sheet surfaces.

It is to be understood that the foregoing detailed description is given merely by way of illustration and that many variations may be made therein without departing from the spirit of our invention.

Having described our invention what we desire to secure by Letters Patent is:

1. A method of bonding cellulose acetate sheets one to the other, which comprises applying to the surfaces to be bonded a dispersion of particles of cellulose acetate in between about 7 and 24 parts by weight of a sprayable dispersion medium per part of particles, said particles having a size between about 0.1 and 50 microns, said medium comprising about 2 to 12 parts of a non-volatile plasticizer for cellulose acetate, about 2 to 18 parts of a volatile non-solvent for cellulose acetate, and about 1 to 12 parts of a volatile solvent for cellulos acetate, and pressing said surfaces together to produce a laminated article characterized by absence of distortion along the bonded surface of the sheets.

2. A bonding method as defined in claim 1, in which the plasticizer is selected from the group consisting of dimethyl phthalate, triethyl citrate, dimethoxyethyl phthalate, dibutyl phthalate, diethyl phthalate, triphenyl phosphate, diacetin and triacetin, in which the non-solvent is selected from the group consisting of methanol, ethanol, 1-propanol, 2-propanol, denatured ethanol, 1-butanol, benzene, toluene and carbon tetrachloride, and in which the solvent is selected from the group consisting of ethoxyethyl acetate, methoxy acetate, acetone, methyl ethyl ketone, methyl isobutyl ketone and ethyl acetate.

3. A laminated article as produced by the method of claim 1.

References Cited in the file of this patent

UNITED STATES PATENTS

| | | |
|---|---|---|
| 1,815,444 | Moss | July 21, 1931 |
| 2,809,120 | Sloan | Oct. 8, 1957 |
| 2,809,192 | Sloan | Oct. 8, 1957 |
| 2,872,340 | Newman et al. | Feb. 3, 1959 |
| 3,022,653 | Baird | Feb. 27, 1962 |